United States Patent [19]
Takenaka

[11] Patent Number: 5,745,859
[45] Date of Patent: Apr. 28, 1998

[54] PORTABLE RADIO TELEPHONE HEADPHONE

[75] Inventor: Hidetoshi Takenaka, Saitama, Japan

[73] Assignee: NEC Corporation, Tokyo, Japan

[21] Appl. No.: 627,064

[22] Filed: Apr. 3, 1996

[30] Foreign Application Priority Data

Apr. 11, 1995 [JP] Japan .................................. 7-085137

[51] Int. Cl.$^6$ .................................................. H04Q 7/32
[52] U.S. Cl. ................................................................ 455/568
[58] Field of Search .................................. 455/568, 565; 379/419, 428, 430

[56] References Cited

U.S. PATENT DOCUMENTS 5,191,602  3/1993  Regen et al. .............................. 455/568

*Primary Examiner*—William Cumming
*Attorney, Agent, or Firm*—Young & Thompson

[57] ABSTRACT

A portable radio telephone device has a main telephone unit and a microphone-speaker/headphone set connected to the main telephone unit by a curled cord cable. The microphone-speaker/headphone set includes a transmitter amplifier and a receiver amplifier which function as differential amplifiers for amplifying the difference between an AC component on a voice signal ground line connected to the main telephone unit and the transmitted and received voice signals, respectively. Variations (AC component) in the ground level of the main telephone unit are added to the voice signals to cancel noise produced in the voice signals even when periodic level variations are developed between the ground levels of the microphone-speaker/headphone set and the main telephone unit.

2 Claims, 2 Drawing Sheets

5,745,859

1

PORTABLE RADIO TELEPHONE HEADPHONE

BACKGROUND OF THE INVENTION

1. Field of the Invention

The present invention relates to a portable radio telephone device, and more particularly to a portable radio telephone device for use on an automobile.

2. Description of the Related Art

FIG. 1 of the accompanying drawings shows a conventional portable radio telephone device for use on an automobile.

As shown in FIG. 1, the conventional portable radio telephone device generally comprises a main telephone unit 5a and a microphone-speaker/headphone set 3a connected to the main telephone unit 5a by a curled cord cable 4a and powered by a car battery 1 mounted on the automobile.

The microphone-speaker/headphone set 3a comprises a power source 6 connected to the car battery 1 for supplying electric energy to the main telephone unit 5a, a bias voltage circuit 7 connected to the power source 6, a transmitter amplifier 8 having an output terminal connected to a transmitted voice signal input terminal of the main telephone unit 5a, the transmitter amplifier 8 receiving a reference output voltage from the bias voltage circuit 7, a receiver amplifier 9 having an inverting input terminal connected to a received voice signal output terminal of the main telephone unit 5a, the receiver amplifier 9 receiving the reference output voltage from the bias voltage circuit 7, a microphone amplifier 10 having an input terminal connected to a microphone 12 and an output terminal connected to an inverting input terminal of the transmitter amplifier 8, and a speaker amplifier 11 having an output terminal connected to a speaker 13 and an input terminal connected to an output terminal of the receiver amplifier 9. The power source 6, the transmitter amplifier 8, the receiver amplifier 9, and a power source ground terminal are connected through the curled cord cable 4a to the main telephone unit 5a.

If noise produced by a generator 2 on the automobile is applied to the car battery 1, then when the main telephone unit 5a is transmitting a voice signal, since a large current flows through the curled cord cable 4a to the main telephone unit 5a, a voltage drop is developed across the curled cord cable 4a due to its impedance Z, and hence the ground level of the main telephone unit 5a varies periodically in timed relation to the added noise, as compared with the ground level of the microphone-speaker/headphone set 3a. The ground level of the microphone-speaker/headphone set 3a as viewed from the ground level of the main telephone unit 5a varies periodically in timed relation to the added noise. Therefore, a transmitted voice signal delivered from the transmitter amplifier 8 to the main telephone unit 5a contains noise representing the variations of the ground level within the main telephone unit 5a. As a result, the noise may be heard by the party to which the voice signal is transmitted from a radio transmitter and receiver 14 of the main telephone unit 5a.

Similarly, because ground level of the main telephone unit 5a as viewed from the ground level of the microphone-speaker/headphone set 3a varies periodically in timed relation to the added noise, a received voice signal delivered from the main telephone unit 5a to the receiver amplifier 9 contains noise representing the variations of the ground level within the microphone-speaker/headphone set 3a. Consequently, the noise is heard from the speaker 13.

2

If the main telephone unit 5a is of a digital circuit arrangement, then a large current flows periodically through the curled cord cable 4a because of intermittent signal transmission between the main telephone unit 5a and the microphone-speaker/headphone set 3a. Inasmuch as a voltage drop is developed across the curled cord cable 4a due to its impedance Z, the ground level of the microphone-speaker/headphone set 3a and the main telephone unit 5a varies periodically in timed relation to the intermittent signal transmission. As a consequence, noise will also be heard by the party to which the voice signal is transmitted from the main telephone unit 5a and also heard from the speaker 13.

SUMMARY OF THE INVENTION

According to the present invention, there is provided a portable radio telephone device comprising a main telephone unit having a radio transmitter and receiver and a microphone-speaker/headphone set connected to the main telephone unit by a curled cord cable, the microphone-speaker/headphone set comprising a power source connected to a car battery for supplying electric energy to the main telephone unit, a bias voltage circuit connected to the power source, a transmitter amplifier having an output terminal connected to a transmitted voice signal input terminal of the main telephone unit, the transmitter amplifier receiving a reference output voltage from the bias voltage circuit, a receiver amplifier having an inverting input terminal connected to a received voice signal output terminal of the main telephone unit, the receiver amplifier receiving the reference output voltage from the bias voltage circuit, a microphone amplifier having an input terminal connected to a microphone and an output terminal connected to an inverting input terminal of the transmitter amplifier, and a speaker amplifier having an output terminal connected to a speaker and an input terminal connected to an output terminal of the receiver amplifier, the power source, the transmitter amplifier, the receiver amplifier, and a power source ground terminal being connected through the curled cord cable to the main telephone unit, the curled cord cable including a voice signal ground line connected to a ground terminal of the main telephone unit, for adding an AC component thereon to the reference output voltage from the bias voltage circuit, the voice signal ground line being connected to non-inverting input terminal of the transmitter amplifier and the receiver amplifier.

According to the present invention, there is also provided a portable radio telephone device comprising a main telephone unit having a radio transmitter and receiver and a microphone-speaker/headphone set connected to the main telephone unit by a curled cord cable, the microphone-speaker/headphone set comprising a power source connected to a car battery for supplying electric energy to the main telephone unit, a bias voltage circuit connected to the power source, a transmitter amplifier having an output terminal connected to a transmitted voice signal input terminal of the main telephone unit, the transmitter amplifier receiving a reference output voltage from the bias voltage circuit, a receiver amplifier having an inverting input terminal connected to a received voice signal output terminal of the main telephone unit, the receiver amplifier receiving the reference output voltage from the bias voltage circuit, a microphone amplifier having an input terminal connected to a microphone and an output terminal connected to an inverting input terminal of the transmitter amplifier, and a speaker amplifier having an output terminal connected to a speaker and an input terminal connected to an output terminal of the receiver amplifier, the power source, the transmitter amplifier, the receiver amplifier, and a power source ground terminal being connected through the curled cord cable to the main telephone unit, the curled cord cable including a voice signal ground line connected to a ground terminal of the main telephone unit, the microphone-speaker/headphone set further comprising a capacitor connected at an end thereof to the voice signal ground line, first and second resistors connected between another end of the capacitor and non-inverting input terminals of the transmitter amplifier and the receiver amplifier, respectively, and third and fourth resistors connected between a reference output voltage terminal of the bias voltage circuit and the non-inverting input terminals of the transmitter amplifier and the receiver amplifier, respectively.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 1:
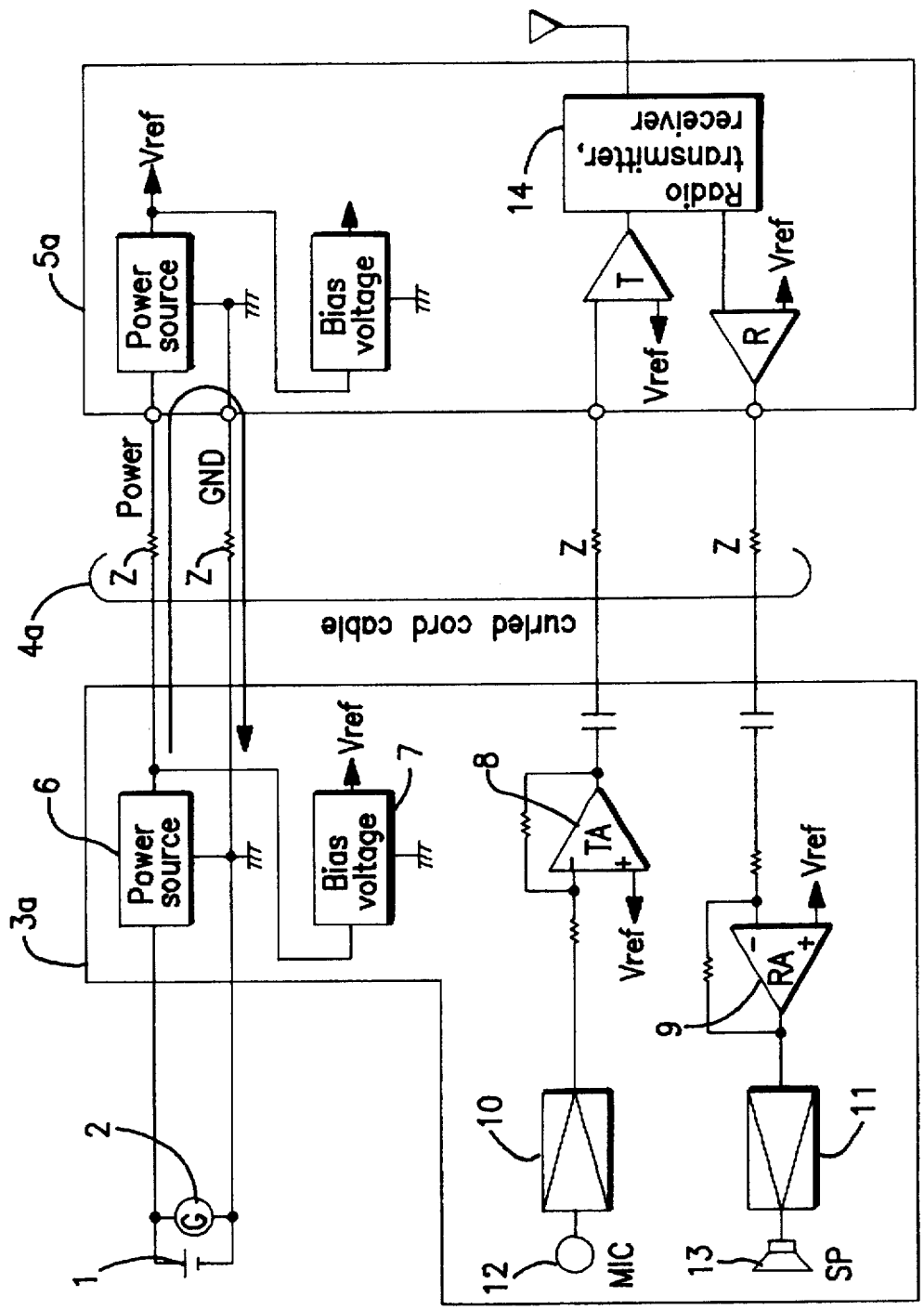
FIG. 1 is a block diagram of a conventional portable radio telephone device.
Figure 2:
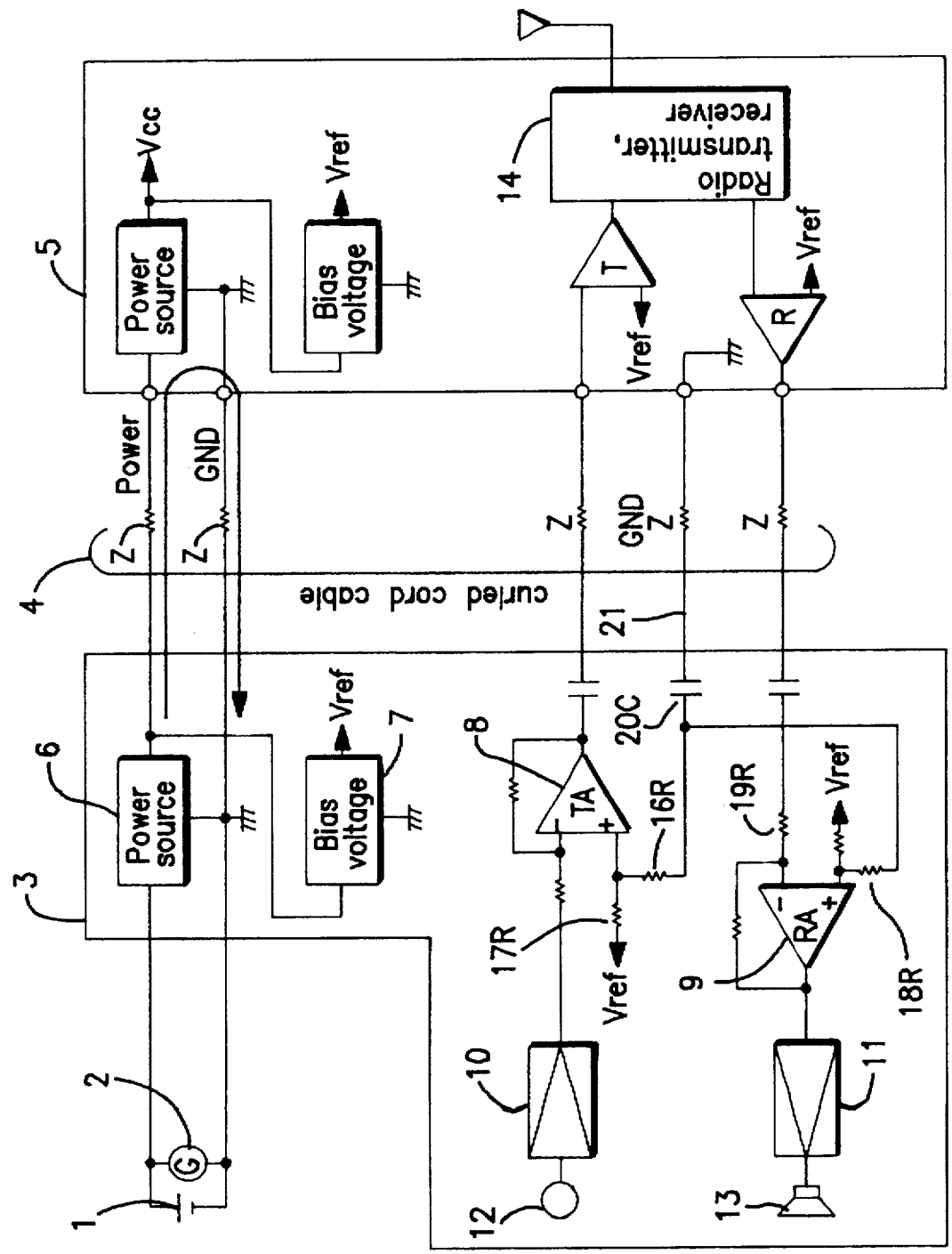
FIG. 2 is a block diagram of a portable radio telephone device according to an embodiment of the present invention.

As shown in FIG. 2, a portable radio telephone device according to an embodiment of the present invention has certain components identical to those of the conventional portable radio telephone device shown in FIG. 1. Those identical components are denoted by identical reference numerals in FIG. 1.

The portable radio telephone device according to the embodiment of the present invention differs from the conventional portable radio telephone device shown in FIG. 1 as follows: A curled cord cable 4 interconnecting a microphone-speaker/headphone set 3 and a main telephone unit 5 includes a voice signal ground line 21. The microphone-speaker/headphone set 3 has a capacitor 20C connected at an end thereof to the voice signal ground line 21 and at the other end thereof to non-inverting input terminals of the transmitter amplifier 8 and the receiver amplifier 9 through respective resistors 16R, 18R. Resistors 17R, 19R are connected between the reference output voltage terminal of the bias voltage circuit 7 and the noninverting input terminals of the transmitter amplifier 8 and the receiver amplifier 9, respectively. The transmitter amplifier 8 and the receiver amplifier 9 serve as differential amplifiers for amplifying the difference between an AC component on the voice signal ground line 21 and the transmitted and received voice signals, respectively.

In the microphone-speaker/headphone set 3, periodic variations (AC component) in the ground level of the main telephone unit 5 as viewed from the ground level of the microphone-speaker/headphone set 3 are added to a transmitted voice signal by the transmitter amplifier 8. In the main telephone unit 5, the noise is canceled from the transmitted voice signal from the transmitter amplifier 8.

Similarly, periodic variations (AC component) in the ground level of the main telephone unit 5 as viewed from the ground level of the microphone-speaker/headphone set 3 are added to a received voice signal transmitted from the main telephone unit 5 by the receiver amplifier 9. Therefore, the noise is canceled from the received voice signal outputted from the receiver amplifier 9.

According to the present invention, as described above, the portable radio telephone device has a voice signal ground line connected to the ground terminal of the main telephone unit for adding an AC component on the voice signal ground line to the reference output voltage from the bias voltage circuit of the microphone-speaker/headphone set, and the voice signal ground line is connected to the non-inverting input terminals of the transmitter and receiver amplifiers, which function as differential amplifiers for amplifying the difference between the AC component on the voice signal ground line and the transmitted and received voice signals, respectively. Accordingly, even when periodic level variations are developed between the ground levels of the main telephone unit and the microphone-speaker/headphone set due to noise from the generator on the automobile and intermittent signal transmission between the main telephone unit and the microphone-speaker/headphone set, the transmitter and receiver amplifiers connected to the main telephone unit for amplifying the transmitted and received voice signals function as differential amplifiers for amplifying the difference between the AC component on the voice signal ground line and the transmitted and received voice signals, respectively, thereby canceling the noise caused by the variations in the ground level.

While a preferred embodiment of the present invention has been described using specific terms, such description is for illustrative purposes only, and it is to be understood that changes and variations may be made without departing from the spirit or scope of the following claims.

What is claimed is:

1. A portable radio telephone device comprising:

a main telephone unit having a radio transmitter and receiver; and a microphone-speaker/headphone set connected to said main telephone unit by a curled cord cable;

said microphone-speaker/headphone set comprising:

a power source connected to a car battery for supplying electric energy to said main telephone unit;

a bias voltage circuit connected to said power source;

a transmitter amplifier having an output terminal connected to a transmitted voice signal input terminal of said main telephone unit, said transmitter amplifier receiving a reference output voltage from said bias voltage circuit;

a receiver amplifier having an inverting input terminal connected to a received voice signal output terminal of said main telephone unit, said receiver amplifier receiving the reference output voltage from said bias voltage circuit;

a microphone amplifier having an input terminal connected to a microphone and an output terminal connected to an inverting input terminal of said transmitter amplifier; and a speaker amplifier having an output terminal connected to a speaker and an input terminal connected to an output terminal of said receiver amplifier;

said power source, said transmitter amplifier, said receiver amplifier, and a power source ground terminal being connected through said curled cord cable to said main telephone unit;

said curled cord cable including a voice signal ground line connected to a ground terminal of said main telephone unit, for adding an AC component thereon to the reference output voltage from said bias voltage circuit, said voice signal ground line being connected to non-inverting input terminal of said transmitter amplifier and said receiver amplifier.

2. A portable radio telephone device comprising:

a main telephone unit having a radio transmitter and receiver; and a microphone-speaker/headphone set connected to said main telephone unit by a curled cord cable;

said microphone-speaker/headphone set comprising:

a power source connected to a car battery for supplying electric energy to said main telephone unit;

a bias voltage circuit connected to said power source;

a transmitter amplifier having an output terminal connected to a transmitted voice signal input terminal of said main telephone unit, said transmitter amplifier receiving a reference output voltage from said bias voltage circuit;

a receiver amplifier having an inverting input terminal connected to a received voice signal output terminal of said main telephone unit, said receiver amplifier receiving the reference output voltage from said bias voltage circuit;

a microphone amplifier having an input terminal connected to a microphone and an output terminal connected to an inverting input terminal of said transmitter amplifier; and a speaker amplifier having an output terminal connected to a speaker and an input terminal connected to an output terminal of said receiver amplifier;

said power source, said transmitter amplifier, said receiver amplifier, and a power source ground terminal being connected through said curled cord cable to said main telephone unit;

said curled cord cable including a voice signal ground line connected to a ground terminal of said main telephone unit;

said microphone-speaker/headphone set further comprising:

a capacitor connected at an end thereof to said voice signal ground line;

first and second resistors connected between another end of said capacitor and non-inverting input terminals of said transmitter amplifier and said receiver amplifier, respectively; and third and fourth resistors connected between a reference output voltage terminal of said bias voltage circuit and the non-inverting input terminals of said transmitter amplifier and said receiver amplifier, respectively.

* * * * *